INVENTORS
VIRGIL STARK
ARTHUR E. WASTIE
JACQUES SLIOSBERG

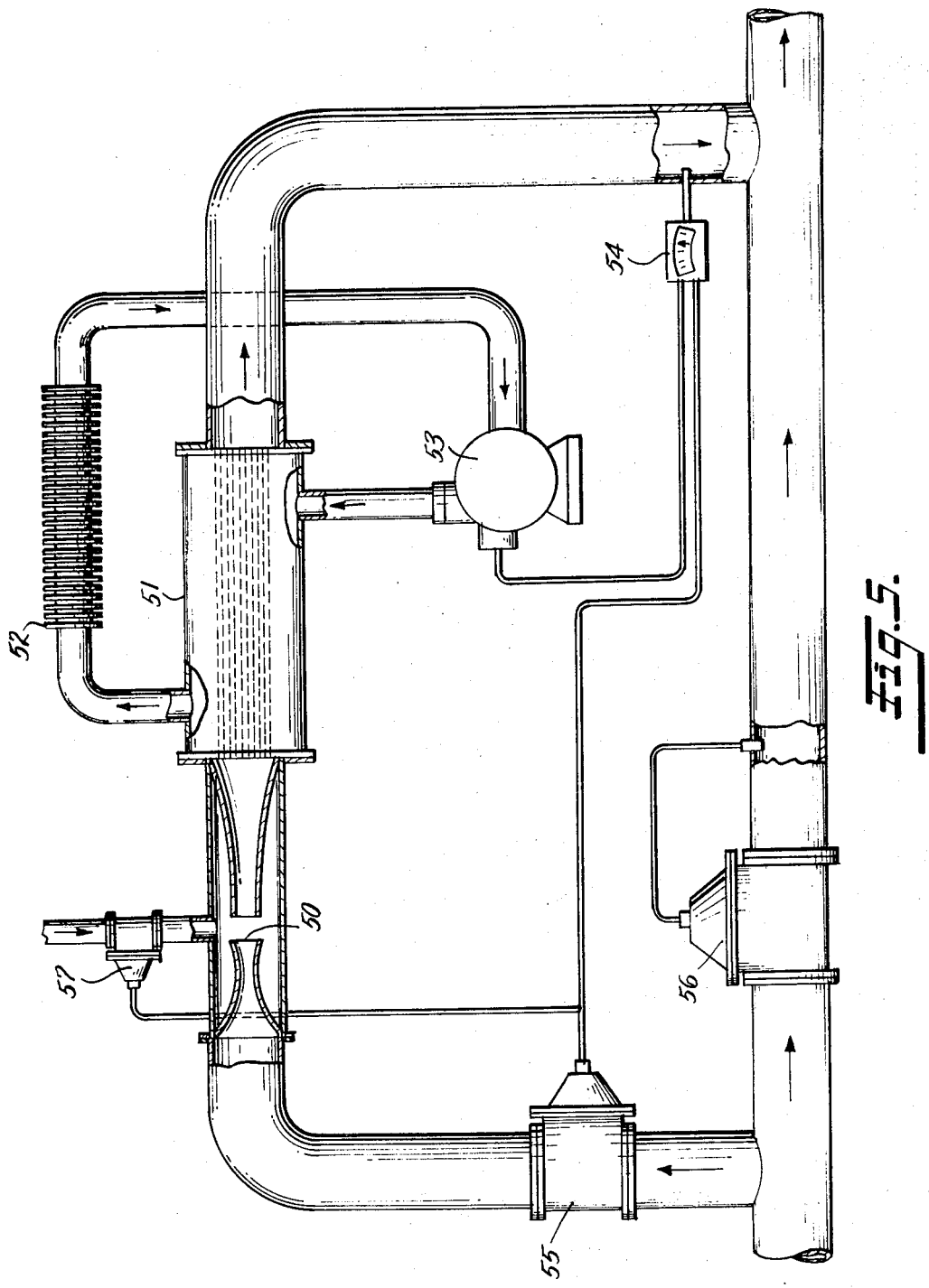

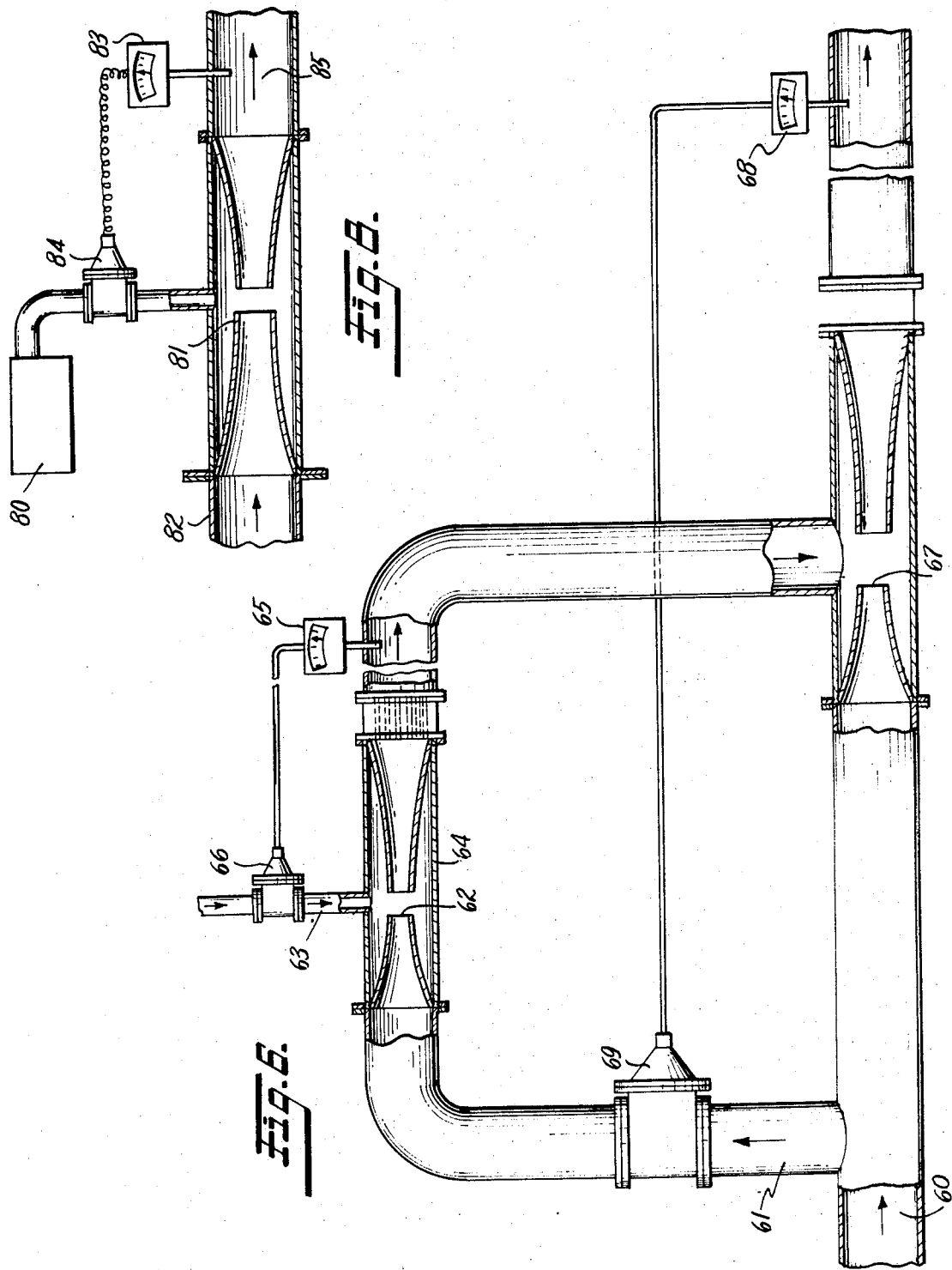

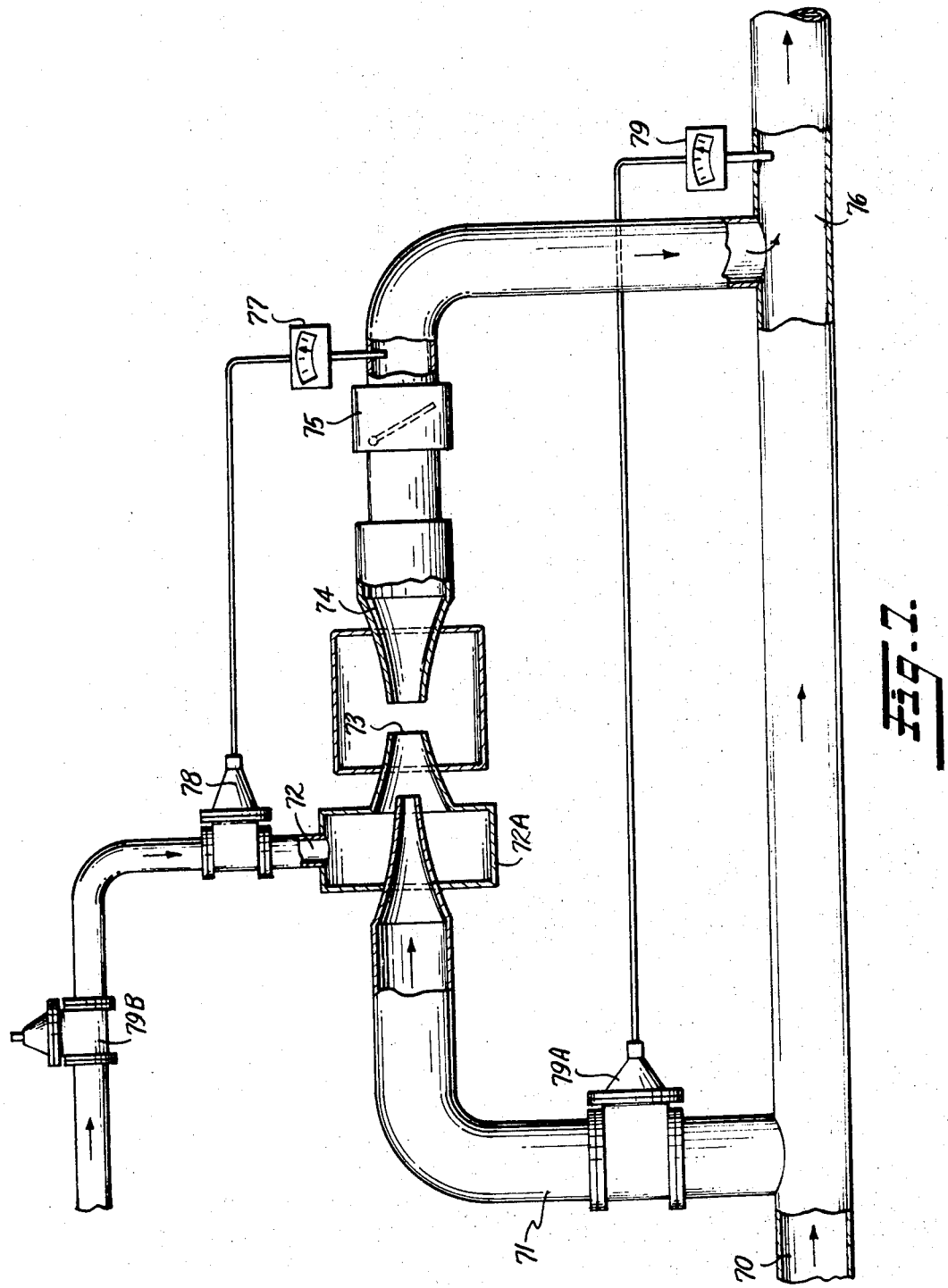

2,689,237
Patented Sept. 5, 1972

3,689,237
FUEL GAS PIPELINE SYSTEM
Virgil Stark, New York, N.Y., Arthur E. Wastie, Westfield, N.J., and Jacques Sliosberg, New York, N.Y., assignors to North American Utility Construction Corporation, New York, N.Y.
Continuation-in-part of application Ser. No. 838,566, July 2, 1969. This application Feb. 19, 1970, Ser. No. 12,586
Int. Cl. B01d 9/04; B05b 7/00; F17d 1/04
U.S. Cl. 48—190                               10 Claims

ABSTRACT OF THE DISCLOSURE

A method of and apparatus for increasing the gas load of the fuel gas pipeline by controlled injection of a cryogenic liquefied gas or hydrocarbons in liquid or vapor form directly into the gas line, in case of liquid injection to use the heat of the gas stream to supply the latent heat of vaporization to vaporize the liquid injected and to increase the quantity of gas in the line at a given time, which may have means to accelerate the heating of the mixture of cryogenic and fuel gas in the pipeline to prevent frost.

SUMMARY OF THE INVENTION

This application is a continuation-in-part of application Ser. No. 838,566, filed July 2, 1969 which has been abandoned.

This invention relates to a new method and novel system for the injection of Liquefied Natural Gas hereinafter called LNG or Liquefied Petroleum Gas, hereinafter called LPG, into a flowing stream of fuel gas such as natural gas or refinery gas to increase the amount of fuel gas in the pipeline.

Another feature of this invention is the use of the latent heat in the stream of gas to provide sufficient heat of vaporization to change the liquefied gases to vapor.

A further feature is the control of injection so as to maintain a preselected ratio of LNG or LPG into the flowing stream.

Another application of this invention is a controlled injection of hydrocarbons in a vapor form of air, oxygen or, nitrogen in a gas stream.

Another application is to use the controlled injection of a cryogenic liquid into water for freezing of the water for such purposes as desalination of sea water.

The novel system of this invention of controlled injection of cryogenic liquid natural gas or hydrocarbons in a fuel gas stream has the following advantages:

It allows to substantially increase the volume of fuel gas during peakload periods of high consumption of gas;

It allows injection of LNG or LPG into a fuel gas stream eliminating the requirements of pumps or compressors to increase the pressure of the injected liquid gas and reducing the cost of equipment and power therefor;

It allows to use the heat of the stream of gas to supply the latent heat of vaporization required to vaporize the liquid gas and reducing the cost of vaporizers and fuel therefor;

It allows to control the injection of LPG by a set gravity or heat value of the mixed gas after injection;

It allows the use of hydrocarbons such as butane, etc., instead of propane for peakload requirements such hydrocarbons could be lower in cost and lower cost storage than propane;

It will produce a preselected constant heat value of the total gas stream when using a variable component gas, such as refinery gas, by automatically compensating the variation of the heat value by a variable amount of injected LPG and air controlled by gravity or heat content of the gas mixture;

It saves the costly requirements of cryogenic truck tanks or railroad tanks to ship the LNG to other satellites and gas distribution system and reduces the high cost of transportation through such means;

It allows the injection of LNG or hydrocarbons such as LPG, into local gas distribution systems of medium pressures, such as 50 p.s.i.g., without requirements of vaporizers or compressors from cryogenic tanks where LNG is stored at near atmosphere pressure;

It assists in the maritime shipment of LNG into main cryogenic storage tanks by obtaining a lower cost of LNG for injections into transmission lines or avoids costly transportation by railroad to satellite plants;

It may be used to freeze water for such purposes as desalinization of sea water using either LNG or LPG or other cryogenic liquids which are to be used thereafter in a gaseous state.

A novel feature of the invention is a system of injection using the kinetic energy of the flowing fuel gas and the principle of the venturi jet to inspirate the cryogenic gas in liquid form into the high pressure flowing gas stream eliminating the need of LNG or LPG pumps or compressors and reducing the capital investment and power required for this eliminated equipment.

The weight of cryogenic liquid to be added to the pipeline per pound of flowing gas through an injector is determined by making an enthalpy heat balance, which considers the various factors such as the coefficients for the conversion of kinetic energy into thermal energy, the design of the venturi injector, the back pressure, etc.

The venturi injector will on one side, inspirate the liquid LNG and on the other side, the LNG, so inspirated, will vaporize in part or completely depending on the conditions. This may eliminate the requirements of a vaporizer, and save the capital investment and fuel requirements of a vaporizer. The enthalpy of liquid LNG is of the order of 19 B.t.u./lb. (at 15 p.s.i.a. and $-258°$ F.).

The enthalpy of the flowing gas stream is for instance for methane at 400 p.s.i.a. and 60° F., 388 B.t.u./lb.

As a typical example about three pounds of natural gas from a natural gas stream at 400 p.s.i.a. and 60° F. would inspirate and vaporize about one pound of liquid LNG with a pressure of the mixture after the venturi jet, of the order of 85 p.s.i.a. and a temperature of about $-150°$ F.

An alternate embodiment of this invention is a system of injection of LNG using a pump at the pressure of the pipeline and using the heat of the gas stream to vaporize the LNG. This system will eliminate the requirement of a vaporizer, the capital investment and the fuel they require. The heat for vaporization is supplied by the stream of gas to cover the latent heat of vaporization and the sensible heat which would be for instance of the order of 256 B.t.u./lb. of liquid LNG at 400 p.s.i.a. For example, for vaporizing one pound of liquid LNG about 1.7 lbs. of natural gas flow will be required, the temperature of the mixture of vaporized LNG and gas flow will be of the order of $-150°$ F., in a gas flow at 400 p.s.i.a. and 60° F. before the introduction of LNG.

Another embodiment of this invention is to use the introduction of LNG in several successive steps and locations to increase the quantity of LNG introduced in the pipeline. After introducing the first liquid LNG and vaporizing it as described above, the temperature of the mixed vaporized LNG and gas flow will gradually increase from $-150°$ F. by absorbing heat from the ground surrounding the pipeline or from a specially provided heating means. A second introduction of liquid LNG could be made at a location distant from the first one at which the gas has been heated up to a selected temperature.

This system allows the introduction of another quantity of liquid LNG and its vaporization by the flowing gas mixed with the vaporized first LNG introduced. Additional introductions of LNG can be made at distances beyond the second introduction of LNG after allowing the mixture to be heated again by the surrounding media. These successive introductions of liquid LNG can be made without limitation and it eliminates the requirements of vaporizers and the investment and fuel they require.

The temperature of the stream of gas in which LNG is injected will be lower after the LNG injection. The gas mixture will be gradually heated through the pipe by the warmer ground surrounding the pipeline, or other media of heating as shown hereafter. It is desirable that the temperatures of the stream of gas containing the injected LNG be kept higher than a certain temperature, for instance, $-100°$ F. after a certain distance from the location of the injection.

As carbon steel used in the pipe will crystallize at about $-130°$ F., the use of carbon steel pipe is not to be considered for pipe within a certain distance from the injection location, where the temperature may be as low as $-100°$ F. Less expensive alloy steel or other metals which withstand low temperatures, can be used in pipe and apparatus in the areas where the temperatures will not be lower than $-100°$ F.

Depending upon the selected temperature of the mixture, size of pipe, pressure conditions, method of vaporization, etc., a temperature probe is located at a preselected distance downstream from the injector to sense the temperature of the mixed flowing stream. In turn, the temperature probe will activate a control valve in the LNG line to control the proper proportion of LNG injected to maintain the selected temperature of the mixture.

The temperature of the mixed gas stream will depend on various elements such as:

(a) Flow of natural gas, its pressure and temperature
(b) Quantity of LNG injected
(c) Timing of injection periods
(d) Heat transfer to the area surrounding the pipe in the injection area.

Preferred embodiments of this invention are shown in the drawings in which:

FIGS. 3–7 show various systems for accelerating the heating of the gas LNG mixture in the pipeline to prevent frost.

One embodiment of this novel system is to inject the LNG intermittently and control such injection by a specially designed temperature controller. The injection of LNG will be interrupted or reduced when gas LNG mixture reaches a preselected temperature, such as for example, $-100°$ F. at a selected location.

After the LNG and flowing gas are mixed at some precontrolled temperature, the temperature of the mixed gas is raised downstream from the mixing point by absorption of heat from the pipeline and surrounding subsoil or a heating media.

The control valve can be operated on a stop and go basis or on a throttling basis. In both cases, the quantity of injected LNG will vary with the temperature setting of the controller.

The natural gas pipelines are designed for pressures of the order of 800 p.s.i.g., for instance, during low consumption periods, the pressure in the natural gas pipeline may thus be as high as 800 p.s.i.g. However, during the peak-load periods specially in the cold months, because of the much higher demand, the pressure in the natural gas pipeline is much lower, down to for instance 400 p.s.i.a. Thus the capacity of the natural gas pipeline is much greater at high pressure than at low pressure. However, the gas pipeline could have a pressure of 20 to 1000 p.s.i.g. prior to adding the liquefied gas.

A comparative pipeline capacity at various pressures is as follows—

| Pipeline pressure, p.s.i.a. | Pressure difference/ mile, p.s.i. | volume, M.c.f./ hr. |
| --- | --- | --- |
| 200 | 5 | 1,200 |
| 400 | 10 | 2,500 |
| 600 | 15 | 3,700 |
| 800 | 20 | 5,000 |

Figure 1:
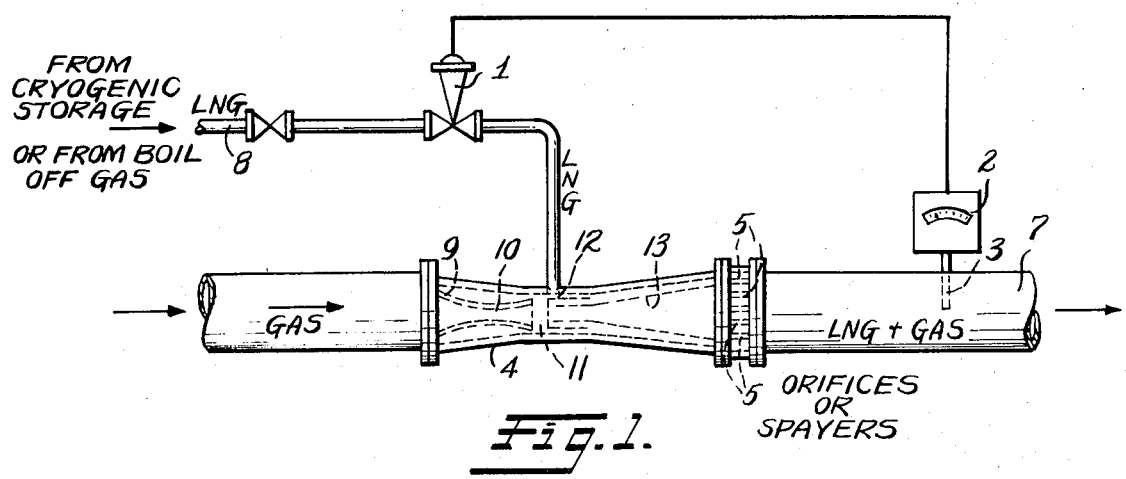
FIG. 1 shows the use of a venturi system to inject the LNG into a gas pipeline.

To handle the above processes of injecting the cryogenic fluid into a flowing gas stream, specially designed equipment is required that will withstand the conditions it will be exposed to. FIG. 1 shows a temperature controller having a thermostatic probe 3 that is introduced in the pipeline 7 at a selected location, which actuates controller 2 which in turn transmits an electric or pneumatic signal to a pneumatically or electrically controlled control valve 1 in the cryogenic line 8 which used a proportional control signal from the controller to modulate or control the cryogenic flow to the inspirator. This valve is designed for cryogenic temperatures as low as $-260°$ F. using a nickel-alloy steel or some other suitable material.

In FIG. 1 a venturi jet 4 which has a flange connection 9 for the admission of gas at an ambient temperature, a nozzle 10 for increasing the velocity of said gas to develop the required kinetic energy in the gas flow; a combining tube 11 in which the main flow of gas impinges on the cryogenic fluid which enters through inlet connection 12; and a delivery tube 13 in which the fluids are mixed at low temperatures; outlet diffuser 5 with proper nozzles to separate the mixture into several high velocity streams for better vaporization of the entrained cryogenic fluid and for better heat transfer between the flowing and entrained fluids. The venturi jet inspirator 4 nozzle to diffuser 5, combining tube 11, connection 12, delivery tube 13 should be a stainless steel or high nickel content steel or other proper materials due to the cryogenic temperatures encountered.

Figure 2:
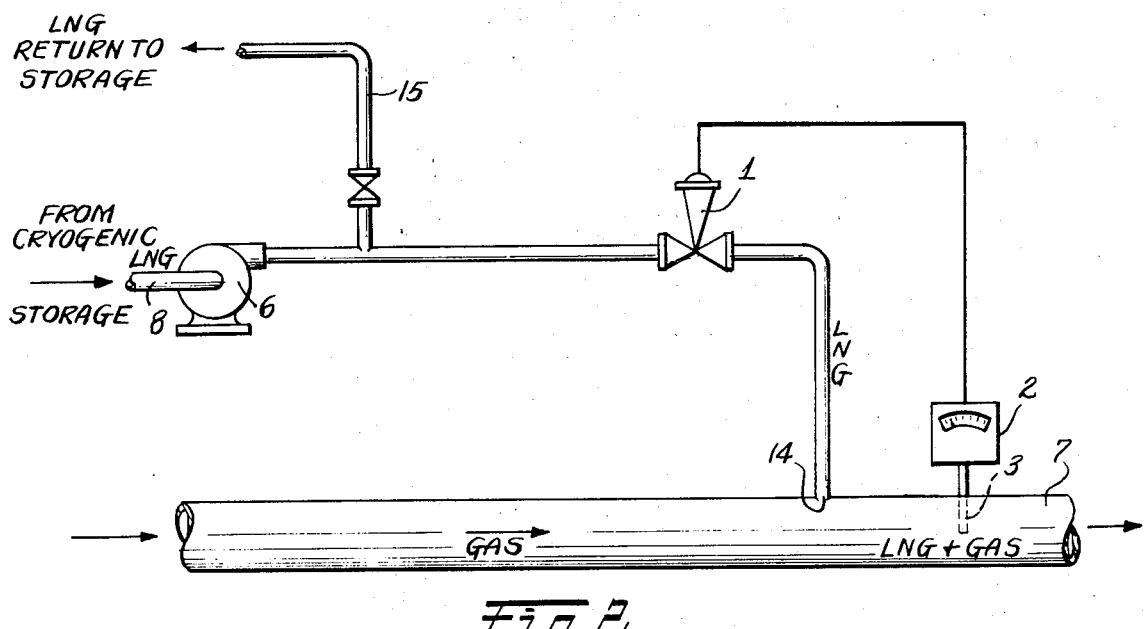
FIG. 2 shows the use of a pump to inject the LNG into a gas pipeline.

FIG. 2 shows a second embodiment of the invention in which a pump 6 is used to inject the cryogenic into main gas line 7. The injection of cryogenic liquid gas into pipe 7 at point 14 is controlled by control valve 1. The excess portion of the cryogenic gas is returned to the cryogenic storage area which is not shown, through pipe 15.

The process described above provides, among other features, the direct injection of cryogenic liquefied gas or LNG into a gas line using the heat capacity of such flowing gas to vaporize the LNG.

The gas pipe will be for a certain length, at very low temperatures up to the location where it will be heated by the ground up to the selected higher temperature, such as $-100°$ F. and thereafter up to the surrounding ground temperatures. The colder areas will freeze a certain portion of the surrounding ground and this lower temperature reduces the heat flow transfer rate from the soil in the colder area.

Another innovation of this invention provides for means of accelerating the heating of the mixture of LNG and flowing gas after injection of LNG in the colder areas of the pipeline. The heat transfer acceleration may be accomplished in various ways and the following methods illustrate a number of preferred methods of providing this heat transfer.

The natural gas flow, may be divided into two or more parts before part of it is used to inject the LNG into the system. Part of the volume of warm gas at a temperature of, for instance 60° F., will be used to vaporize the LNG in the manner described above. The other portion of the warm gas which will also be at the same temperature (60° F.) will be used to flow in one or more concentric pipes as shown hereafter surrounding the pipeline conducting the cold mixture of vaporized LNG and gas so that it warms the gas mixture more rapidly by a heat exchange relationship.

Figure 3:
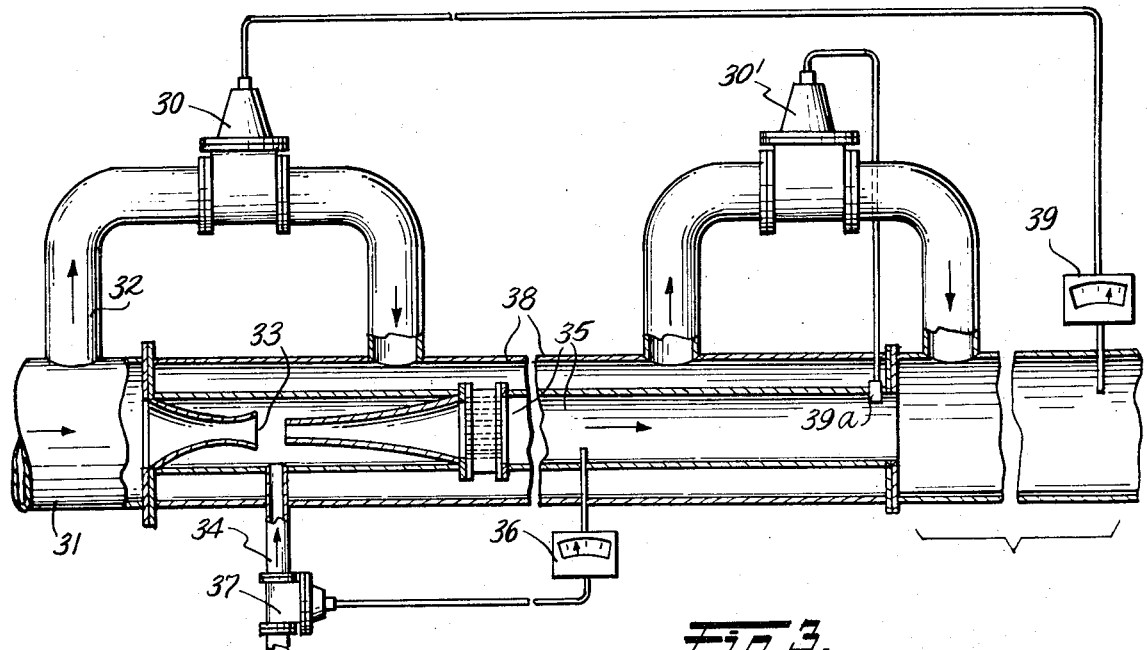

FIG. 3 shows one method of using warm gas flowing in pipe 31, part of this gas is flowing through a venturi jet 33 to mix with and inspirate LNG through pipeline 34 and vaporize it. The other part of the warm gas flows through pipeline 32 to the concentric pipeline 38 to be used to warm up the cold mixture flowing through mixing tube 35 at the outlet of the venturi jet. The warm gas in pipeline 31, at high pressure enters the venturi jet 33 and inspirates LNG 34 and this mixture of LNG and gas flows through mixing tube 35. The flowing gas supplies sufficient heat to vaporize the LNG. The quantity of LNG injected is controlled by temperature controller 36 which actuates the flow control valve 37 in the LNG line 34. The warm flowing gas in pipeline 32 enters pipe sleeve 38 or one of several interconnecting heat exchange tubes, enveloping the mixing tube 35, transmitting its heat to the cold mixture. The quantity of warm flowing gas in pipeline 32 is controlled by temperature controller 39 actuating flow control valve 30. As the cold mixture in mixing tube 35 is at a lower pressure than the flowing gas in pipeline 31, a pressure controller 30' maintains this pressure at the same pressure as at the mixer tube 35 outlet by means of pressure tap 39a. At these equal pressures the warm and cold gases mix and are maintained at some predetermined temperature by temperature controller 39 actuating control valve 30.

Figure 4:
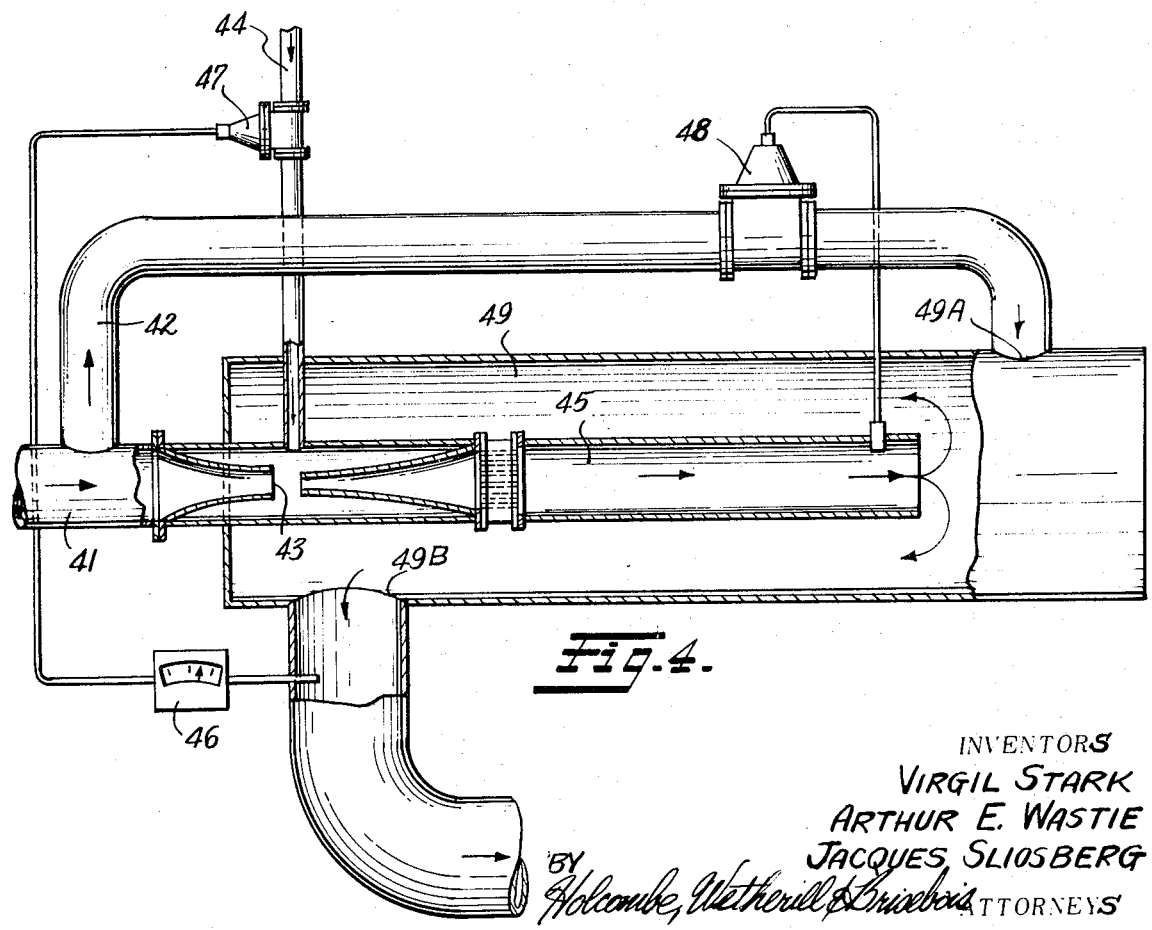

A second heating method is shown in FIG. 4, in which the direct intermingling of warm flowing gas enters into a plenum chamber in which the warm gas and the cold gas mixture mix and a counter flow of this combined mixture passes around the venturi jet as shown and described below. In this method, the total volume of gas is used to warm up the mixture. Part of the warm flowing gas in pipeline 41 at high pressure enters the venturi jet 43 and inspirates LNG through pipe 44 and this mixture of LNG and gas flow through mixing tube 45. The warm flowing gas 42 is pressure controlled by controller 48 maintaining this pressure at the same pressure as the cold mixed gas at the outlet of the mixing tube 45. Warm gas enters plenum chamber 49 and 49A where it mixes with the partially warmed cold gas mixture. The gases then are directed in a counter flow around the mixing tube 45 increasing the relative velocity of the flow and they leave the plenum chamber 49 outlet 49B. The temperature of this final mixture is controlled by temperature controller 46 which actuates control valve 47 which controls the quantity of the LNG entering the system.

A third method of heating the gas mixture is circulating a warmer liquid which cannot freeze below certain temperatures, such as an antifreeze solution, in a surrounding pipe system using a pump for recirculation of the cooled antifreeze solution after it has been heated by conventional means. FIG. 5 shows a typical method of using this type of heat exchange system. The warm gas enters the venturi 50 injecting LNG into the mixing tube where it is combined with the warm gas. The resultant mixture is heated by means of the heat exchanger 51 circulating the warm antifreeze solution around the cold mixing tube. The heat exchanger solution leaving the heat exchanger, has lost heat to the cold LNG-Gas mixture and a secondary conventional heat exchanger 52 reheats the solution and this heated solution is then returned by pump 53 to the heat exchanger 51. The temperature controller 54 actuates the flow control valve 55, the circulating pump 53 and the LNG valve 57. The pressure in the pipeline is controlled by pressure regulator 56.

Another method of heating the gas mixture consists of using any of the methods shown in FIGS 3, 4, or 5, combined with the additional feature shown in FIG. 6, which eliminates the requirement of the pressure control valve shown in the systems shown in FIGS. 3 to 5. That is heat exchangers 38 in FIG. 3, 49 in FIG. 4, and 51 in FIG. 5 can be eliminated using the modification shown in FIG. 6.

This modification is based upon the fact that the pressure in the venturi injector area is lower than the pipeline pressure of the warm gas entering the venturi jet. The higher pressure of the gas in the pipeline not used for the injection of LNG passes through a second venturi jet which inspirates the colder mixture coming out of the LNG inspirating jet and increases the pressure of the final combined gas mixtures. The warm gas passing through this jet will supply heat to warm up the incoming colder gas mixture which includes the vaporized LNG. Referring to FIG. 6 the warm flowing gas in pipeline 61 enters the venturi jet 62 inspirating LNG through pipe 63 and passes through the mixing tube 64. The final mixture of the cold gas is controlled by temperature controller 65 which actuates a valve 66 in the LNG line maintaining a predetermined temperature. Due to pressure and inspiration losses the outlet pressure of the venturi 62 is at a lower pressure than the warm flowing gas. The warm gas 60 passes through a venturi jet 67 which inspirates the cold mixed gas and this gas is heated by the warm gas and is discharged at some controlled pressure and temperature by temperature controller 68 which actuates flow control valve 69 in the warm gas line to the venturi.

This method can be combined with either one or several of the methods shown in FIGS. 3, 4, and 5 to further warm the gas after leaving the venturi jet 67 and thereby increase the final pressure.

A fifth method of heating the gas mixture when using a venturi jet for injecting LNG, the pressure after such a jet is lower than the pressure of the pipeline. If part of the warm gas is used as in the manner shown in the previous alternate heating methods, a pressure regulator is required in the warm pipeline flow to match the pressure at the outlet of the venturi jet. This provision may be desirable in case the pipeline pressure has to be reduced anyway for entering the gas mixture into the distribution system or for other purposes, such as industrial uses of the gas. However, in other cases, it is desirable to have a higher pressure after injecting LNG. In this method, referring to FIG. 7, part of the warm gas in pipe 71 is used to entrain and inject the LNG into pipe 72 through an injector 72A and drive the mixture of condensed gas and LNG to a delivery tube 73. The expanding nozzle 74 converts the increased velocity into pressure sufficient to lift the check valve 75 at a higher pressure than the pressure in pipeline 70. The quantity of LNG injected is controlled by temperature controller 77, which actuates control valve 78. An additional temperature controller 79 controls the flow of warm gas in pipe 71 to the venturi mixer through control valve 79A. The condensed gas and LNG is vaporized by mixing it with the warm flowing gas in the pipeline and it is controlled in the manner shown in FIG. 3, FIG. 4 or FIG. 5. A back pressure valve 79B in the LNG line prevents a back flow of high pressure gas or liquid from entering the cryogenic system.

For the injection of LPG or hydrocarbons, the following considerations apply. The injection of LPG or hydrocarbons is limited by their higher gravity than natural gas gravity, to maintain similar burning characteristics of the mixed gas. The LPG or hydrocarbons are mixed with air so that such mixture has a heating value of for instance 1400 B.t.u./c.f. for propane air or 1500 B.t.u./c.f. for butane air.

The air can be either introduced together with the LPG or separately, downstream from the LPG injection. The proportion of the LPG or hydrocarbons introduced in a natural gas pipeline is limited by the dew point of the components in the gas mixture, which depends on the partial pressure of such components and the dew point of the final gas mixture. In case of injection of a LPG-air mixture, the LPG is first vaporized and then mixed with so as to obtain a proper gravity and proper heat constant. For the entrainment of air into the mixture, the kinetic energy of the LPG stored under pressure is used such as in a jet system, for example as described in Pat. No. 3,437,098.

For instance, the outlet pressure of a jet mixing system depends on the inlet pressure of the entraining LPG, the ratio of the fluids in the mixture and the ratio of specific gravity of the gases contained in the mixture, but is generally lower than the pressure of the pipeline. To introduce the mixture into the pipeline, the kinetic energy of the high pressure pipeline is used to inject the mixture into the pipeline, thus eliminating the cost of compressors and power therefor.

In case of liquid injection, the cost of pumping the liquid into the pipeline is eliminated and also the cost of vaporization by taking advantage of the comparatively higher temperatures of the gas stream to supply the latent heat of vaporization to vaporize the liquid hydrocarbon.

The very low temperatures encountered in the injection of LNG do not exist with the injection of LPG and no special steel has to be used for this application.

However, the injection of hydrocarbons LPG in either liquid or vapor form is to be controlled either by the gravity of the mixed gas or its heat value. A sample connection is introduced in the downstream of the venturi system which will act on a gravitometer or a thermeter or a calorimeter which will activate pneumatically or electrically on one or more control valves controlling the injection input.

In an alternate case, the liquid hydrocarbons can be introduced in the pipeline by a pump instead of a venturi system, the latent heat of vaporization of the gas stream supply the heat for the vaporization of the liquid with controls of injection in the pipeline either by gravitometer or thermeter or calorimeter as in the above cases. Air can be compressed and controlled as above on the downstream of the liquid hydrocarbon injection so to obtain a selected gravity and heat value of the final gas mixture. The above methods of injection may allow injection of hydrocarbons into fuel gas stream such as butane, etc., with the advantage of using such lighter hydrocarbons which may be lower in cost and require storage tanks of lower pressure at lower cost, than propane.

Typical controlled injections of LPG in liquid or vapor form or hydrocarbons in a stream of gas such as natural gas or refinery gas is shown in FIG. 8.

In FIG. 8, the injection of LPG is made through a venturi 81 in the pipeline 82 in which the LPG mixed with the flowing gas and the final mix is controlled by a sample controller 83, acting on control valve 84 located after the LPG air mixer 80.

Depending on the proportion of the injected mixture the gravity of the final mixed gas stream will increase. For instance, if the mixture of propane air of 1400 B.tu./c.f. is 20% of the total volume, the gravity of propane (1.5) and air (1.0) will be 1.29 and the gravity of the stream after mixture will be 0.738 (composed of 80% Natural Gas at 0.60 specific gravity and 20% of propane-air at 1.29 specific gravity). A sample connection in the pipeline 85 will act on a gravitometer 83 which will be set at a certain top limit for gravity such as 0.74 and when this gravity is reached then the gravitometer will activate pneumatically or electrically a diaphragm valve 84 which will control the input of LPG gas-air into the venturi system 81. The injection can also be controlled by the final heat value of the mixed gas either by a thermeter or calorimeter 83 which activates control valve 84.

Figure 9:
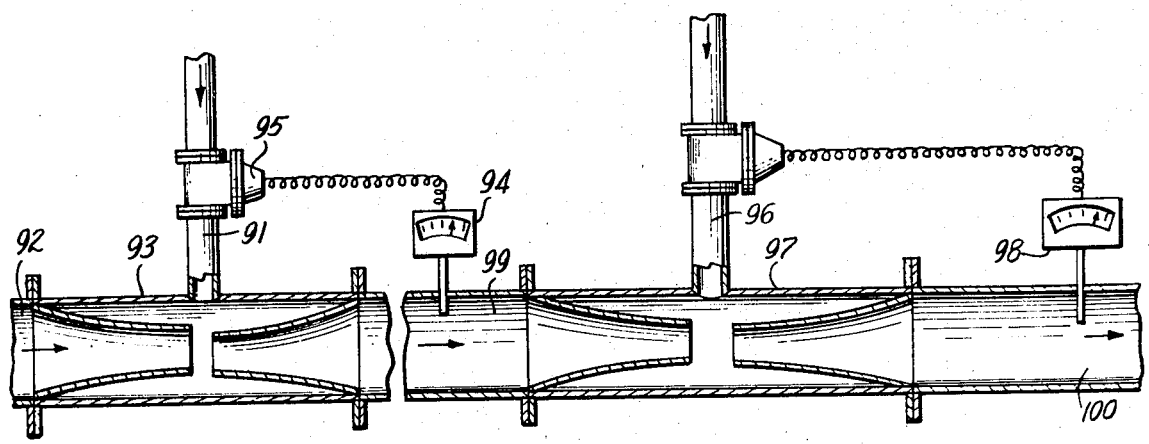

FIG. 9 illustrates the injection of a liquid hydrocarbon such as LPG through pipeline 91 into a flowing gas stream flowing through pipeline 92 through a venturi system 93. In this case, the liquid is inspirated into the flowing stream through the venturi 93 and vaporized by the flowing stream of warmer gas supplying the latent heat of vaporization of the liquid to be vaporized. For instance, the latent heat required for the vaporization of propane is 184 B.tu./lb. (at 60° F. and 14.7 p.s.i.g.).

The injection of liquid is controlled by a gravitometer or thermeter or calorimeter 94 with a sample connection 99 which acts on a control valve 95 controlling the flow of liquid injected.

At a downstream location air from pipeline 96 is injected through another venturi 97. A downstream sample connection in the pipeline acting through a gravitometer or thermeter or calorimeter 98 controls the quantity of air to be inspirated so that the final mixture of natural gas, LPG and air have a preselected gravity or heat value.

Another possibility is to have one control of the gravity or heat value of the final mixed gas acting on both the injection of liquid LPG and of air.

Figure 10:
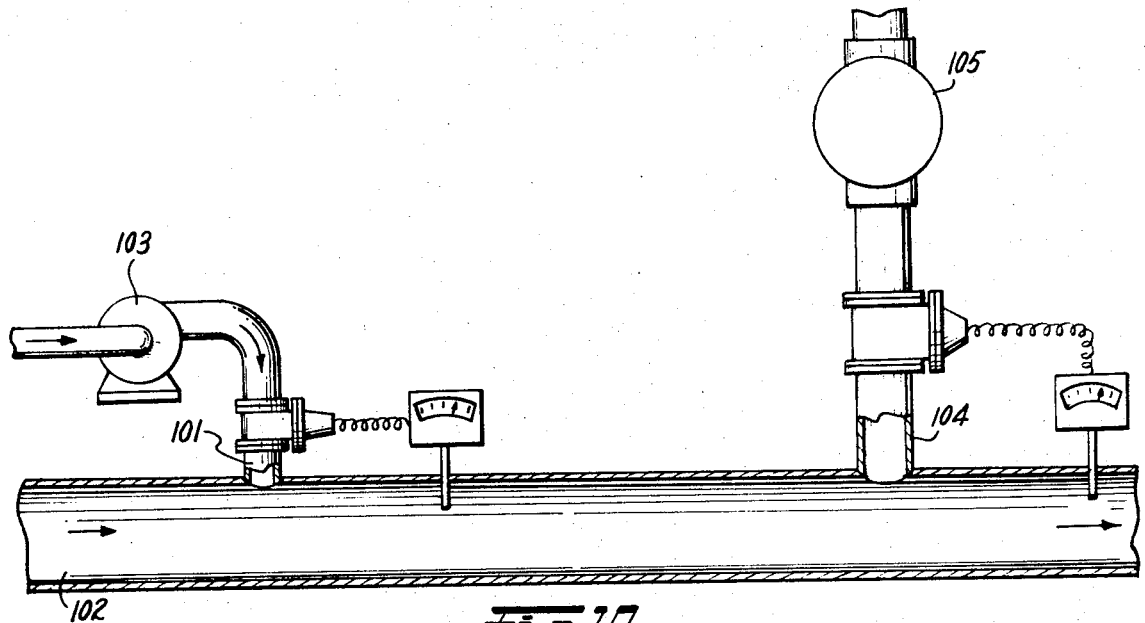

FIG. 10 shows an alternate method of injecting liquid hydrocarbon through pipe 101 into a pipeline 102 by a pump 103 with controls similar to the one shown in FIG. 9. In this case air through pipe 104 enters the pipeline 102 at the same pressure by using an air compressor 105.

After injection of LPG in a gas stream by an injector, the pressure and the temperature of the mixed gas will be lower than that of the initial gas stream and will depend on the quantity of LPG injected. The higher the pressure of the mixed gas, the higher will be the dew point of the gas mixture which may result in condensation under certain conditions. However, the injection of LPG for peakload requirements is made, after the gate station of a utility company or industrial users the pressure is at such a gate station reduced from the pressure of the transmission line of, for instance, 400 to 750 p.s.i.g. to 125 to 150 p.s.i.g. As the temperature of the natural gas will be substantially lowered when this pressure reduction occurs, the natural gas in the pipeline is heated before entering the distribution system. Duly, thereafter, LPG is injected so that such injection is made in a stream of lower pressure and higher temperatures gas stream which will eliminate the risk of condensation in the mixed gas stream.

Another feature of this invention with similar process and apparatus applies to a stream of refinery gas instead of natural gas. The heat value of refinery gas varies from 800 to 1600 B.t.u./c.f. The injection of LPG and air will allow to obtain a constant preselected heat value for the mixed gas.

What is claimed is:

1. A process of increasing the amount of fuel gas in a fuel gas pipeline during peak load or above average load periods comprising injecting a controlled amount of a cryogenic liquefied fuel gas during above average load periods in a fuel gas pipeline containing a flowing stream of fuel gas, allowing the latent heat of vaporization required to change the liquefied gas into the gaseous state to be taken from said fuel gas in said pipeline to increase the amount of flowing fuel gas in said pipeline, and controlling the reduction of temperature of said fuel gas in said pipeline to a desired temperature by controlling the amount of liquefied gas added to said pipeline.

2. The process of claim 1, in which said liquefied fuel gas contains liquefied natural gas.

3. The process of claim 1, in which the pressure in said gas line is 20 to 1000 p.s.i.g. prior to adding said liquefied gas.

4. The process of claim 1, in which the volume of said liquefied gas added to said gas stream is controlled so as to allow injection of said liquefied gas on a stop and go basis which is determined by selected high and low temperature limits at a downstream location to stop injection of said liquefied gas at said lower selected temperature limit and start injection of said liquefied gas at said upper selected temperature limit.

5. The process of claim 1, in which said liquefied gas is added to said pipeline by a venturi injector system the input into which is regulated by a controlling apparatus which is actuated by the temperature of the mixture of stream gas and liquefied gas injected in the stream gas.

6. The process of claim 1, in which said cryogenic liquefied fuel gas is added to said fuel gas stream until the temperature in the mixing area is about −100° F., and then allowing the mixed flowing stream to be gradually heated in the pipeline in which the mixture is conducted to the temperature surrounding the pipeline.

7. The process of claim 6, in which the mixture of liquefied gas and cooled fuel gas is also heated by additional heating means.

8. The process of claim 1, in which the mixture of liquefied gas and cooled fuel gas is heated by heating means to avoid freezing the area surrounding the pipeline and frosting of the pipeline.

9. The process of claim 8, in which part of the fuel gas is mixed with the liquefied gas, and another part of the fuel gas is used to heat the fuel gas-liquefied gas mixture.

10. The method of claim 1, in which the stream gas flowing injection and condensation of the LNG entering the flow system, in the pipeline is used to entrain and inject the liquid fuel gas into said pipeline through an injector and drive the mixture of condensed gas and liquid fuel gas into a delivery provided with an expanding nozzle which converts the increased gas velocity into increased gas pressure.

References Cited

UNITED STATES PATENTS

| | | | |
|---|---|---|---|
| 1,922,573 | 8/1933 | Dunkak | 137—90 X |
| 2,349,521 | 5/1944 | Schmidt | 137—90 X |
| 2,522,026 | 9/1950 | Evans | 48—196 X |
| 2,678,877 | 5/1954 | Ransome | 48—184 |
| 2,737,965 | 3/1956 | Newman | 137—90 |
| 2,767,025 | 10/1956 | Griffith | 261—39 X |
| 3,014,705 | 12/1961 | Colucci | 261—16 |
| 3,257,180 | 6/1966 | King | 48—190 X |
| 3,419,369 | 12/1968 | Kelley | 48—190 X |
| 3,437,098 | 4/1969 | Stark et al. | 137—12 |
| 2,097,771 | 11/1937 | Nelson | 431—DIG 67 |
| 2,609,282 | 9/1952 | Haug et al. | 48—190 X |
| 3,074,783 | 1/1963 | Paull | 48—196 X |
| 2,958,205 | 11/1960 | McConkey | 48—190 X |
| 3,417,563 | 12/1968 | Loprete | 60—39.71 X |
| 3,517,510 | 6/1970 | Melenric | 60—39.71 X |
| 3,597,923 | 8/1971 | Simon | 60—39.71 X |

JOSEPH SCOVRONEK, Primary Examiner

U.S. Cl. X.R.

48—180 R, 180 P, 191, 196 R; 62—58; 137—6, 90, 604; 210—59; 261—16, 39, 78, 118, 130, 131, 141, 149, 158